Figure 1:
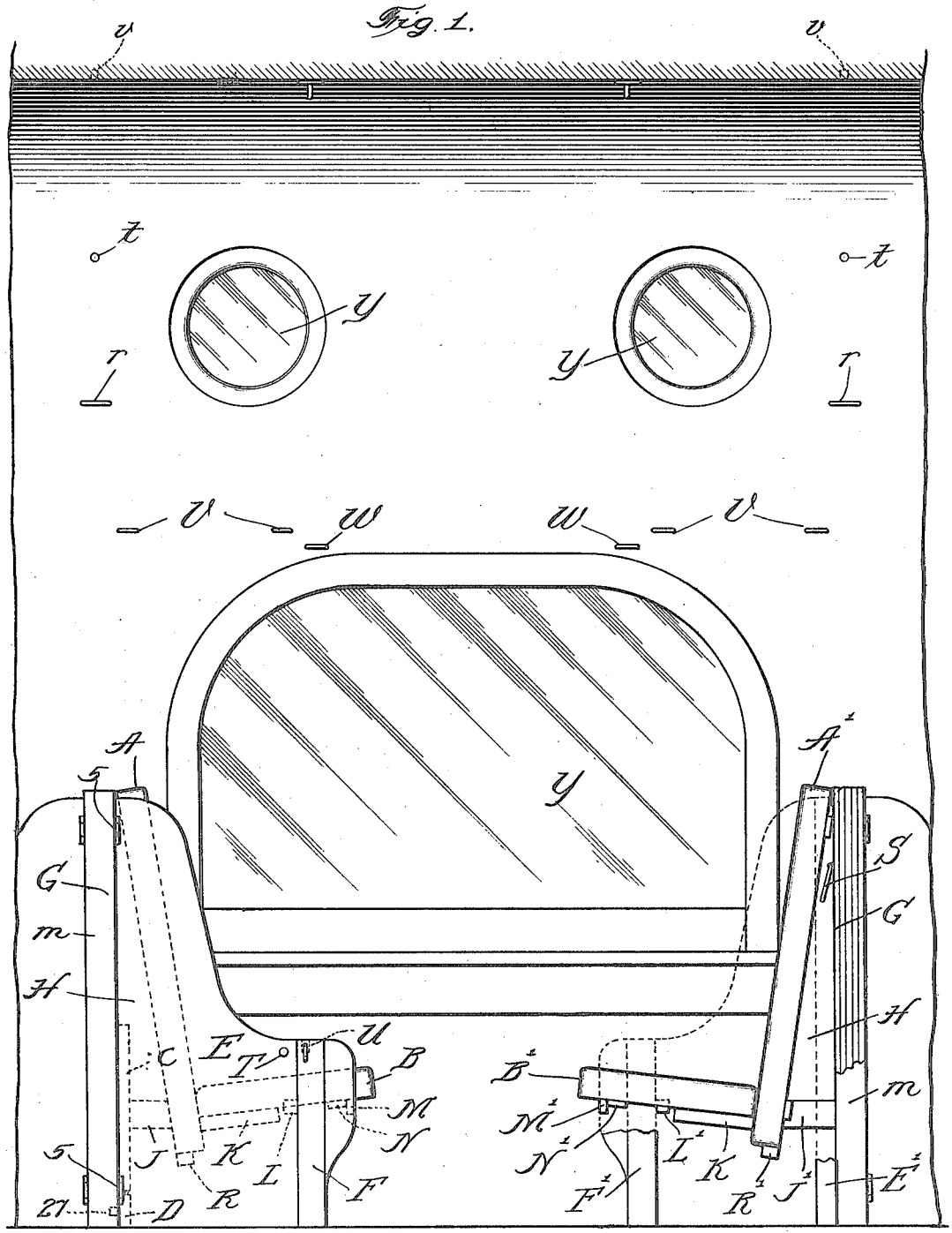

O. M. DONALDSON.
SLEEPING CAR.
APPLICATION FILED MAY 2, 1912.

1,135,268.

Patented Apr. 13, 1915.
4 SHEETS—SHEET 1.

Witnesses:
Geo. L. Gaylord.
Chas. H. Buell.

Inventor:
Orren M. Donaldson,
By Harry Irwin Cromer,
Atty.

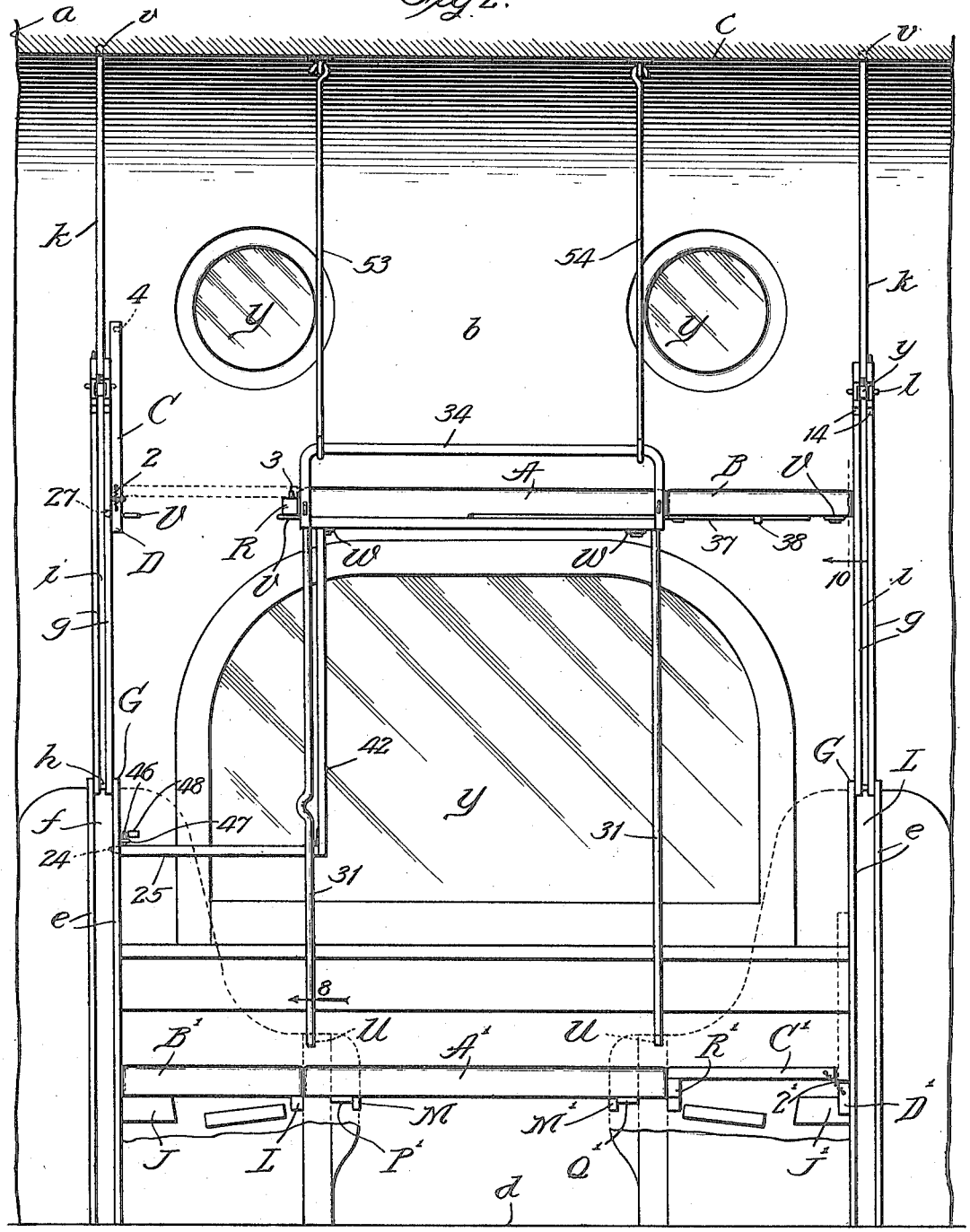

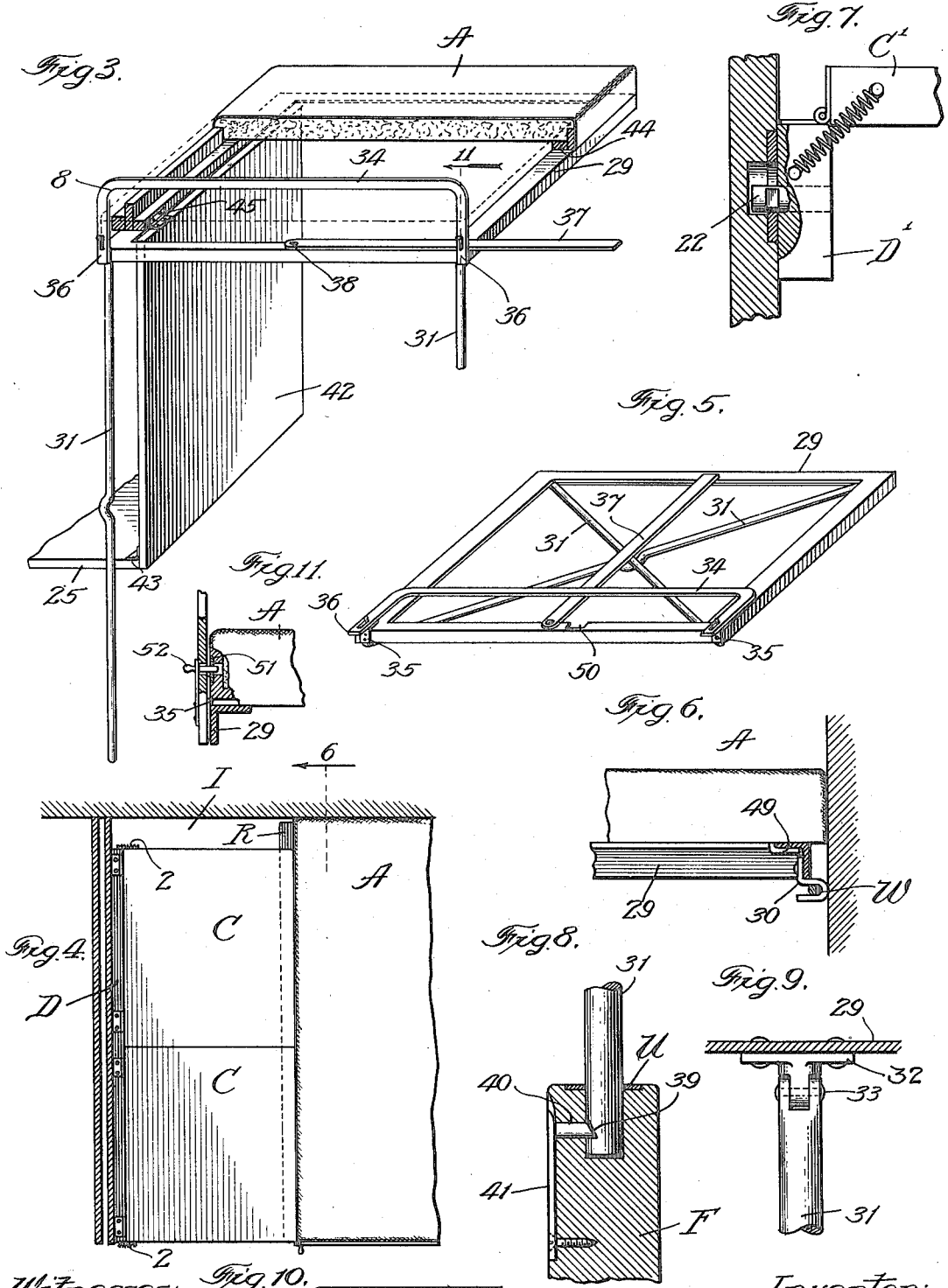

O. M. DONALDSON.
SLEEPING CAR.
APPLICATION FILED MAY 2, 1912.
1,135,268.
Patented Apr. 13, 1915.
4 SHEETS—SHEET 4.
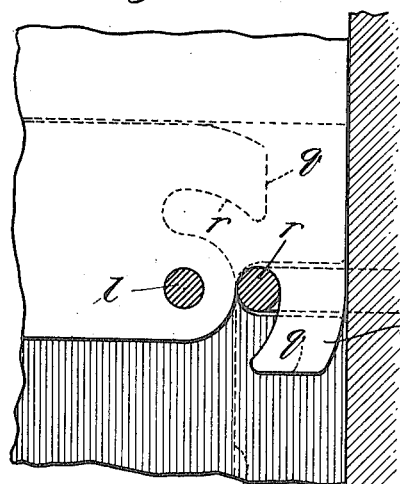
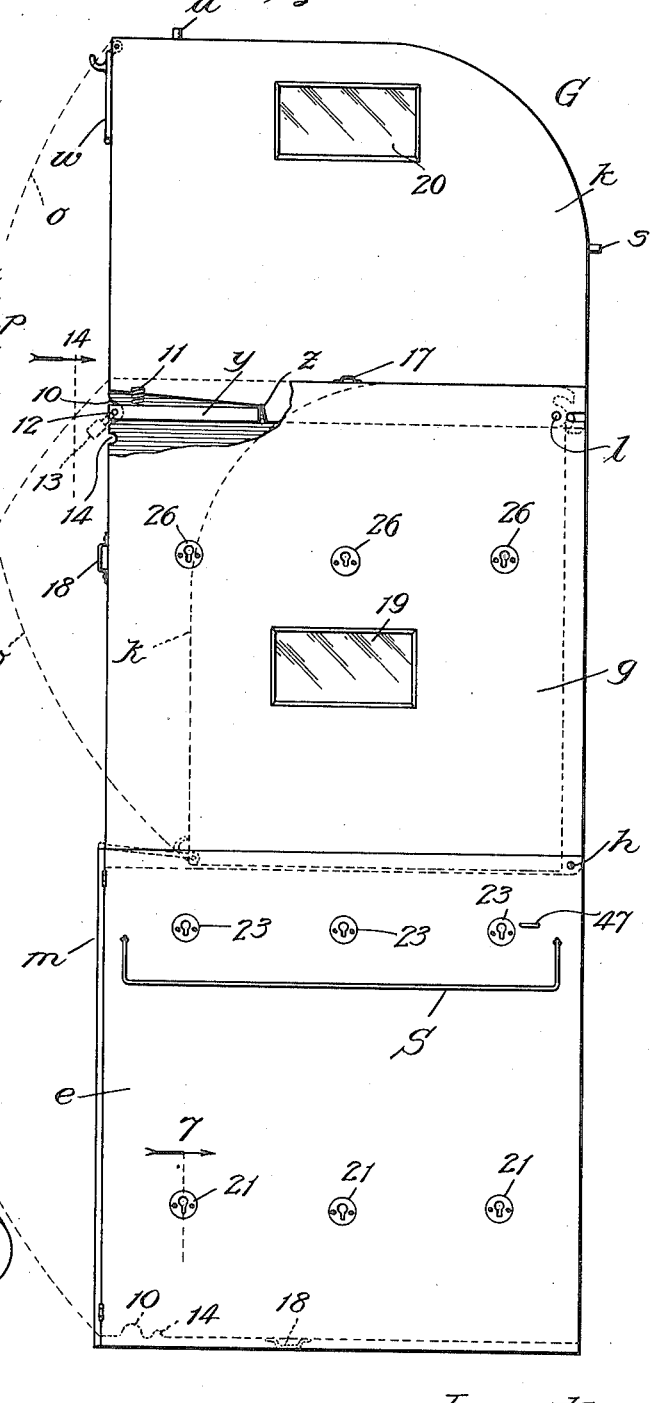
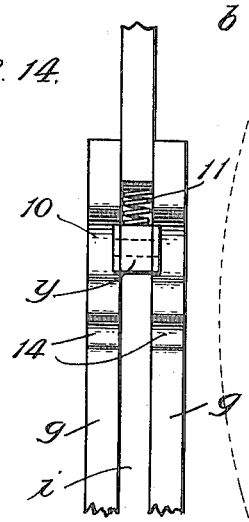
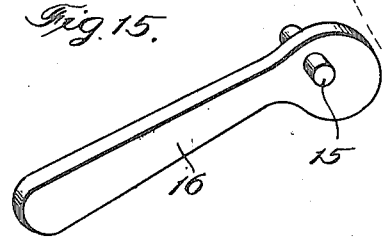
Inventor:
Orren M. Donaldson,
By Harry Irwin Cromer
Atty.

UNITED STATES PATENT OFFICE.

ORREN M. DONALDSON, OF RIVER FOREST, ILLINOIS.

SLEEPING-CAR.

1,135,268.   Specification of Letters Patent.   Patented Apr. 13, 1915.

Application filed May 2, 1912. Serial No. 694,702.

*To all whom it may concern:*

Be it known that I, ORREN M. DONALDSON, a citizen of the United States, residing in River Forest, county of Cook, and State of Illinois, have invented certain new and useful Improvements in Sleeping-Cars, of which the following is a specification.

This invention relates to that class of sleeping cars having a car body provided with a series of removable or extensible and foldable or collapsible partitions adapted to divide the car into a plurality of compartments or sections, and having convertible cushions or seat members for each section adapted to form either seats or berths as desired.

The principal object of the invention is to provide a simple, economical and efficient sleeping car.

A further object is to provide a sleeping car having convertible seat or berth members adapted to form either berths or seats as desired, and having partition members adapted to divide the interior of the car into the desired number of compartments or sections when desired, all so constructed and arranged as to enable the portion of the car above the fixed seat frames to be left free and clear of all obstructions when the convertible seat members or cushions are to be used as seats.

A further object is to provide a car having partition portions for dividing the interior of the car into suitable compartments, with convertible cushion or seat members adapted to form either berths or seats for the respective compartments as desired and having a platform within each compartment and located below the level of the upper berth and above the level of the lower berth and with a space over the platform and between the end of the upper berth and one of the partitions and adapted to be covered by a foldable head rest or berth member, whereby when such head rest is raised, sufficient space above the platform will be afforded for enabling an occupant to stand erect while dressing or undressing, and the head rest may be lowered into position to complete the upper berth.

A further object is to provide in a sleeping car having an upper berth or berths adapted to be constructed as above set forth, suitable, convertible cushion or seat members adapted to form a lower berth having a foldable portion between the stationary portions of such lower berth and one of the partitions so constructed and arranged as to provide a space in such lower portion of the compartment below the upper berth which will enable an occupant to stand erect beneath the upper berth while dressing or undressing, and to fold the foldable portion of the berth down into operative position while in or on the berth.

Other and further objects of the invention will appear from the examination of the drawings and from the following description and claims.

The invention consists in the features, combinations, and details of construction herein described and claimed.

In the accompanying drawings Figure 1 is a view in longitudinal vertical section of a portion of a car constructed in accordance with my improvements, and showing a compartment or section constructed in accordance with my invention, and provided with a convertible cushion or seat members arranged in position to be used as seats; Fig. 2, a similar view showing the partitions of the compartment or section shown in Fig. 1 in raised or extended position and the convertible cushion or section members of such compartment in position to form upper and lower berths, and provided with a platform for the upper berth and removable sections for the upper and lower berths adapted to enable occupants of either or both berths to stand erect therein; Fig. 3, a detail perspective view showing the removable supporting frame for supporting the central portion of the upper berth, and showing the removable platform and the central convertible cushion or seat member in position upon such frame; Fig. 4, a detail plan view of the head rest and a portion of the center upper berth member showing the head rest in lowered operative position and the space between the head rest and side wall of the car for enabling clothes to be hung in position to extend above and below the berth; Fig. 5, a detail perspective view of the removable frame for supporting the center portion of the upper berth, showing such frame in folded position; Fig. 6, a detail view in section taken on line 6 of Fig. 4 showing the means for connecting the removable frame to the side wall of the car and the means for securing the center upper berth section to the frame shown in Fig. 5; Fig. 7, a detail view of the means for connecting the lower head rest with the partition member, as it would appear with said parts in position when taken on line 7 of Fig. 12 looking in the direction of the arrow; Fig. 8, a detail view on line 8 of Fig. 2 showing the means for connecting the legs of the removable frame to the seat frame; Fig. 9, a detail view in elevation of the upper end of one of the legs of the removable, foldable frame shown in Figs. 3 and 5, showing the means for connecting such leg with said frame; Fig. 10, a detail view taken on line 10 of Fig. 2 showing the means for supporting the end cushion or convertible member of the upper berth; Fig. 11, a detail view in section taken approximately on line 11 of Fig. 3, showing the upper berth guard and means for supporting the center convertible side member or cushion in position upon the frame shown in Figs. 3 and 5; Fig. 12, a detail view in elevation of an improved foldable partition formed of a plurality of pivotally connected sections constructed in accordance with my invention and improvements; Fig. 13, an enlarged detail view of the lower right hand corner of the upper panel or foldable partition section shown in Fig. 12, showing the manner of connecting such panel with the side wall of the car; Fig. 14, an enlarged detail view in elevation taken approximately on line 14 of Fig. 12, showing the means for supporting and securing the upper foldable panel in extended or raised position; and Fig. 15, an enlarged detail view in perspective of an operating lever for forcing the upper panel or partition section shown in Fig. 12 into raised operative position in engagement with the ceiling and side wall of the car.

In constructing a sleeping car in accordance with my improvements, I provide a car body $a$ having side walls $b$, a roof or ceiling $c$, and floor $d$, and all forming parts of a complete frame work or car body, which may be of any suitable known or desired form, and which it is not deemed necessary to describe in detail in order to enable those skilled in the art to understand, make and use this invention.

The interior of the car body is provided with a series of partitions G which are adapted to be removably mounted or supported in connection with the seats or seat frames and may form parts of the latter, so as to divide the car into a series of compartments when the partitions are in operative position,—or when the seat members or cushions which form the seats by day are converted into upper and lower berths as hereinafter described,—and so as to enable the partitions to be removed from compartment-forming position when desired, and particularly when the convertible seat members or cushions are in position to be used as seats.

Although the convertible seat members and the means for enabling the upper and lower berths to be made up or taken down and the desired parts thereof utilized to form seats, and other parts to be folded or stored away in compact form, are adapted to be used in connection with any desired form of partitions, without departing from the spirit of this invention, I prefer to employ partitions constructed and adapted to be folded and unfolded, or extended and secured in operative position and collapsed or folded into position to be out of the way and invisible, and without the necessity of removing them or entirely disconnecting them from the seat frames or from the means for supporting the partitions.

Each partition G comprises in its construction a lower fixed seat-frame portion or partition portion formed of panels $e$ $e$, having a space $f$ therebetween, an intermediate or middle foldable partition section or frame portion consisting of a pair of panels or partition wall members $g$, $g$ connected in parallel relation to each other and pivotally connected with the lower members $e$ $e$ by means of a pivot $h$, and adapted to be folded down into the space $f$ between the fixed members $e$, $e$, and provided with a space $i$ between said panels or members $g$, $g$; and an upper foldable partition section or member consisting of a panel $k$ which is pivotally connected at or near one corner with the corner of the intermediate partition section by means of a pivot pin $l$ in position to be swung or folded downward into the space $i$ between the side walls or panels $g$ of such central partition section or member. (See Figs. 1, 2, and 12.) In Fig. 1, the partition at the right of the figure is shown in folded position, with a part of the door $m$, for concealing the edges of the foldable parts of the partition broken away. The door $m$ at the right of Fig. 1, is shown in closed position, in which position it is adapted to conceal the edges of the folded parts of the partition when collapsed. In Figs. 2 and 12 the partitions are shown in full lines in extended or compartment-forming position. The different positions occupied by the foldable portions of the partitions at the various steps or stages in the operation of folding and unfolding the same, are indicated in broken lines in Fig. 12, in which line $n$ indicates the direction or path of movement of the middle partition section or parts $g$, from lowered folded to raised operative position, or vice versa, and line $o$ indicates the direction or path of movement of the upper partition section or panel $k$ with respect to the middle partition member or foldable parts $g$, either to the position indicated in broken lines or from the position shown in broken lines in said Fig. 12, to raised or operative position as shown in full lines in Fig. 12, and also in Fig. 2. The panel or part $k$ is provided with a hook portion $p$ forming a curved slot $q$ adapted to engage a staple $r$ which is mounted in the side wall $b$ of the car, as shown in Fig. 13, in which the position of the member $k$ and its hook portion $p$ and curved slot portion $q$ when in raised operative position and secured to the wall of the car, is shown in full lines, and the position of said parts when lowered or folded within the space between the parts $g, g$ is indicated in broken lines.

The top panel or partition section $k$ of each partition is provided with a pin $s$ shown in Fig. 12, which is adapted to extend into an aperture $t$—shown in Fig. 1—in the side wall of the car, and is also provided with a pin $u$ which projects upward from the upper edge of said part $k$ when the latter is in extended or unfolded position, and into engagement with the ceiling of the car, said pin $u$ being adapted to extend into a suitable aperture or socket $v$ in the ceiling—see Fig. 1—for holding the pin $u$ and thereby the upper edge of the part $k$ securely and removably in position.

A handle $w$ is pivotally secured to the part $k$ as shown in Fig. 12, and is of sufficient length to reach to or beyond the edge of the parts $g$ or middle panel when the upper panel is folded between the parts $g$, as indicated in broken lines in said Fig. 12.

A supporting and locking bar $y$—see Figs. 12 and 14—is secured to the inner edge of the upper panel member $k$ by means of a hinge $z$, and is of sufficient length to project beyond the recessed portions 10 of the middle partition members $g$. A compressible spring 11 is interposed between the upper side of this bar and the lower edge of the partition section $k$ and the outer end of the bar $y$ is provided with an aperture 12 for receiving a securing or locking member such as the locking bolt or hook of a padlock 13, when the latter is in position to extend through the aperture 12 and into engagement with the recessed edge portion 10 of the partition members $g$ $g$, as indicated in Fig. 12. The bar $y$ and spring 11 thus serve to hold the partition section or member $k$ yieldingly in extended, raised or operative position and in engagement with the ceiling and side wall of the car. The partition members $g, g$ are provided with recesses 14, shown in Figs. 2, 12, and 14, which are located adjacent to and below the bar $y$ in position to enable the studs or bosses 15 of an adjusting or operating lever 16—shown in Fig. 15—to be inserted into said recessed portions 14 so that the studs 15 when resting in the recesses will form a fulcrum for the lever when the latter is in position to engage the lower side of the bar $y$, thus enabling said bar, and the panel $k$ to be pressed upward and into operative position. The partition members $g$ are provided with handles 17 and 18, for the convenience of the operator or occupant. Mirrors 19 and 20 are provided and mounted upon the partitions in suitable position for the convenience of the occupants of the respective berths. The partition members $e$ are provided with a series of socket members,—shown in Figs. 12 and 7—for receiving the headed securing and supporting pins 22 on the removable berth member, such as the strip D' which is to be secured to the partition at the points indicated by the location of said socket 9, when the berths are to be made up. Socket members 23—shown in Fig. 12—are mounted on the partition members $e, e$, in position to receive similar headed securing and supporting pins 24 on the edge of the platform 25—shown in Fig. 2—hereinafter more particularly described, for holding the latter in operative position when the berths are in position or made up. Similar socket members 26 which may be of identical construction with socket members 21, are provided and mounted on the partition members $g$ in position to receive and support headed securing pins 27, on the strip D (see Fig. 2) or to receive pins 22 on the strip D' (see Fig. 7), as required. The socket members 26 are thus adapted to form supports for either the board C or C' either of which is adapted to be used as the end member of the upper berth.

When the berths are to be supported in position for use, or made up, the partitions are unfolded from the position indicated in Fig. 1, and extended and secured in raised or operative position as indicated in Figs. 2 and 12 and a foldable supporting frame—shown in Figs. 2, 3, 5 and 6,—for supporting the upper berth or convertible seat members which are to form the upper berth, is mounted in the position shown in Fig. 2. A very desirable and efficient form of frame for this purpose is constructed as illustrated in the drawings, as follows: A rectangular main frame 29, formed preferably of angle iron, and adapted to form a support for one or more of the convertible seat members or berth members which form the upper berth, is provided. (See Figs. 3, 5, 6, 8, 9, 10, and 11.) This frame portion 29 is provided with one or more hooks 30 on the edge which is to be secured to the side wall of the car, adapted to be secured in hooked engagement with staples $w$ which are mounted in suitable position on the side wall of the car to support said frame in operative position. (See Fig. 6.) Standards or legs 31 are hinged at their upper ends, by means of hinges 32, to said frame 29 at points near the edge farthest from the hook or hooks 30, or adjacent to the aisle, and in position to extend downward into apertures or sockets U in the seat frames hereinafter described. (See Fig. 9.) The hinges 32 are adapted to enable the legs 31 to be folded into position to extend diagonally across the under side of the frame, as shown in Fig. 5, thus enabling the legs to be made of the desired length and in one piece, without interfering with the storing of the frame when the legs are folded against the frame. An upper berth guard 34 is secured to the frame 29 on the margin nearest the aisle by means of hinges 35 and is provided with projecting end portions 36 adapted to project downward into engagement with the frame 29 when the guard is in raised or operative position, so as to hold the guard firmly in position to resist any outward pressure thereon whether produced by the cushions to be supported, or by the occupant of the upper berth. A supporting bar or arm 37 is pivotally secured to the frame 29, at or near the center of the aisleward edge of the latter by means of a pivot 38, and is adapted to be swung to the position shown in Figs. 2 and 3, or into position to extend in an opposite direction from the pivot 38, as desired. The arm is also adapted to be swung to the position shown in Fig. 5. This arm 38 is for supporting the aisleward edge of the desired end member of the upper berth, such as the part B shown in Figs. 2, and 10, and hereinafter more particularly described.

The lower ends of the legs or uprights 31 are provided with notches 39—see Fig. 8—and a catch 40 is mounted upon or in engagement with a spring 41 secured to a suitable support such as the seat frame portion F which is elsewhere described, whereby the legs 31 are securely held in operative position.

There are a pair of seats for each compartment or section of the car, and the members or parts of which the respective seats are composed are substantially identical, with the exception of only such differences as are hereinafter mentioned. The seat member A which forms the back of one of the seats of each compartment or section, by preference, differs from that of the similar seat or cushion member A' of the opposite seat of the same section by having attached to said seat member or cushion member A a depending wall member 42 and platform member 25. The platform member is secured to the lower edge of the depending wall member by means of hinges 43—see Fig. 3—and the depending wall member 42 is secured at its upper edge to the inner bottom side or edge of the frame portion 44 of the cushioned convertible seat member A by means of hinges 45, as shown in Fig. 3, so that said depending wall portion and platform are foldable with respect to each other, and said wall portion is foldable from the position shown in full lines in Fig. 3, to a horizontal position beneath the seat member A with its upper surface in the position indicated by broken lines in said figure. The lowered or operative position of the platform 25 and the depending wall member 42, and the means for connecting the platform with the adjacent partition G is best shown in Fig. 2. A staple 46 on the platform 25 is mounted in position to extend through or in engagement with a staple 47 on the partition member e to which the edge of the platform is to be secured, and a padlock 48 secured to the staple 46 serves to prevent the platform from becoming accidentally disconnected from the partition. When the platform 25 is in operative position it is below the level of the frame 29 and upper berth, and above the level of the lower berth, and entirely inside of the compartment formed by the partitions G and the side wall of the car, and the platform 25 is a sufficient distance below the level of the ceiling of the car to enable an occupant to stand erect on said platform and between the depending wall portion 42 and middle berth member and the adjacent partition G. The platform 25 is also located sufficiently near the floor of the car to enable an occupant to readily step onto the seat frame portion or end door E hereinafter described and from the latter, directly onto the platform. The platform and the upper berth are located a sufficient distance above the level of the lower berth, so that there is sufficient room between the upper and lower berths to enable an occupant of the upper berth to stand erect on the platform 25, while dressing and undressing, and to enable occupants of the lower berth to stand erect at the opposite end of the compartment from that in which the platform 25 is located, and to occupy the lower berth in comfort.

The seats of each compartment or section are so constructed as to comprise convertible cushioned seat members A and A', which are adapted to form the backs of the respective seats by day and the middle portions of the upper and lower berths by night. Cushioned seat members B and B' are adapted to form the bottoms of the respective seats of a compartment or section by day and serve to form the end portions of the respective berths by night. These parts A and A' and B and B' each comprise a rigid frame across which is stretched ordinary soft resilient upholstery of the right degree of firmness to make a stable and comfortable cushion. The part A which forms the middle portion of the upper berth is made a trifle longer than the part A' which forms the middle portion of the lower berth, in order to make the upper berth a little longer than the lower berth, to correspond with the distance between the corresponding upper parts of the partitions.

The cushion or seat member B is supported in its place when serving as the bottom of the seat, by the supporting strips M and L and the member B' is supported in its corresponding position by strips M' and L' which are secured to the upright portions of the fixed rigid seat frames F and F'. These supports M, L, M' and L' respectively, extend lengthwise of the seats. The cushions B and B' are also supported by cleats K on the car walls and on the aisle ends of the seat frames, as indicated in Fig. 1. The strips L and L' are notched slightly at the seat ends, as indicated in Fig. 1, to accommodate the slant in the frame work of the cushions B and B'. These bottom cushions are also held from sliding forward by means of the cleats N and N' fastened to their frame work and resting firmly against the strips M and M' respectively. At the back edge the seat cushions rest firmly against the back cushions, each holding the other securely in place.

Head rests C and C'—shown in Fig. 2—form parts of the berths by night, but may be stored away behind the back cushions by day, in the position indicated at the left of Fig. 1. These head rests C and C' are hinged respectively to the blocks D and D', which in turn are removably attached to either one of the partitions G as desired. When stored in this position head rests C and C' are held upright against the adjacent partition by the coil springs 2, 2' attached by screw eyes to the ends of the head rests C and C' respectively, and to the ends of blocks D and D' respectively—see Fig. 2—so that the longitudinal centers of each of the springs passes to one side of the axis or pivot of the adjacent hinge in such a manner as to hold the head rest in raised position when once raised. These springs extend on the opposite side of the axis or the pivot when the head rest is in its lowered positon—see Fig. 2—and serve to hold the head rests down in a horizontal position at night.

When the berths are made up the head rests C and C' form the head portions of the two berths, the lower berth members C' and D' remaining attached to the partition G; but head rest C and block D are removed from their place of storage back of the cushion A and are attached to the extension or panel g of the corresponding partition G—(see Fig. 2)—in the same manner in which head rest C' and block D' are attached to the parts e of the partition G. As either the lower berth members or the upper berth members may constitute either seat when used for forming the seats, both head rests are adapted to be attached to the partition G at either the lower berth level or the upper berth level. And, as each berth may be made up with the head at either end, the head rests C and C' are each adapted to be attached to either of the partitions G and to either the bottom member e or middle member or panel g of either partition G. (See Fig. 2.) When in place as parts of the made up berths the head rests C and C' become removable or folding berth members, being turned up against the partitions, as shown in full lines at the left of Fig. 2 and in broken lines at the right of said figure, to give standing room for the occupants, or turned down to a horizontal position as shown in broken lines at the left of Fig. 2 and in full lines at the right of said figure to complete the formation of the berth or bed. The head rests C and C' are each divided into two parts— (see Fig. 4)—each of which is hinged independently to blocks D and D' respectively, so that when either berth is occupied by two persons one may stand after the other has retired. And the two parts of head rests C and C' do not occupy the entire width of the berth but are provided with a space I between the head rest and the car wall—(see Fig. 4)—in which clothing may be permitted to hang so as to extend above and below the level of the berth. In their horizontal positions the inner or swinging edges of the head rests are supported by the cleats R and R' attached to the frame work of the middle berth members A and A' respectively, and are held in position by pin 3 which extend into holes 4 in the head rest as indicated in Fig. 2.

The head rests C and C' may be constructed of any desired suitable material and are adapted to be cushioned when in their horizontal position by ordinary pillows of the berths which are laid upon them.

The head rest C' and the cushions A' and B' when in their horizontal position— (see Fig. 2)—form the continuous lower berth—the cushion A' on the supports M, M' and L' being kept from slipping lengthwise of the berth by the cleats P' and Q' attached to the frame work of the cushion or convertible seat member A', and coming in contact with strips M and M'. The cushion B' is held by the parts L and J, being secured longitudinally of the berth by the middle portion A' and the partition G.

In Fig. 1, and doors E and E' which form the ends of the seats toward the aisle of the car, are hinged by means of hinges 5 to the partitions G, and are adapted to swing to closed position against the stationary parts of the seat ends F and F' respectively. When the lower berth is made up these parts of the seat ends E and E' form doors for entrance to and egress from the stateroom or standing room portion of said berth,—only the door at the head of the berth being required to be so used. The doors or seat ends E and E' are adapted to be locked to stationary seat frame portions F and F' respectively during the daytime by bolts operated by the knobs T after the manner of a house door. Spaces H—see Fig. 1—are provided back of the seats to be used for storage of bedding and of berth members including frame 29 when not in use by day. Bracket or rods S are attached to the respective partitions, and are adapted to form supports for bedding, by day. Staples V and W—shown in Fig. 1—are fastened to the car wall at the level of the upper berth to support the inside edge of the berth. Each section is provided with suitable windows Y the preferred positions of which are indicated in Fig. 1.

In Fig. 2 both the lower and upper berths are shown in position for use at night, with the head rest C' of the lower berth in horizontal position and the head rest C of the upper berth in upright position.

The cushion or member A on the frame 29 is held constantly against the wall when in the position shown in Fig. 2, by means of the foldable berth guard 34 already described.

The middle portion A, when constructed as above described, is reversible on the supporting frame 29 so that the edge with the attached depending wall member 42 and platform 25 on one side and the cleat R on the other side, for supporting the head rest, may be turned in either direction. In this way either end of the upper berth may be the head, just as either end of the lower berth by reason of the interchangeability of its parts, may be the head. The edge of the berth portion A adjacent to the car wall is held firmly on the frame 29 by a hook 49, which is adapted to engage the edge of the frame 29. (See Fig. 6.) A notch 50 in the inner side of the frame 29 (see Fig. 5.) is adapted to admit the hook 49 when the part A is reversed, thus permitting the cushion member A to lie flat upon the frame 29.

The advantages of the above described construction are that no more space is required for each "section" or compartment than in the ordinary cars now in use. But it gives every berth, both lower and upper, the practical advantages of a stateroom. All of the material employed in the formation of both berths is either used in the formation of the seats, or concealed by the seats, when in use by day. The upper part of the car is thus left free of obstruction, giving increased air space and more room for the hanging of wraps and for collapsible racks for hand luggage. The upper berth apparatus may constitute either seat of the section and either berth is adapted to be made up so as to have its head in either direction. The most convenient way, however, is to have the upper berth head in the opposite direction from that of the lower berth.

By the above arrangement the upper berth may be made up, and its occupants are enabled to retire without disturbing the other seat of the section or compartment which may be used at the same time as a seat if desired. Each berth is adapted to be so made up that the bedding thereon will cover only the cushion members of the berth, while the head rest is in raised position, so as to enable the occupant to stand erect while dressing or undressing. The head rest may be turned down and the pillow placed thereon, by the occupant while in or on the berth. By this plan the upper berth becomes just as desirable as the lower berth, and almost, if not quite, as convenient and accessible.

In operation, the removable frame 29 is removably secured to the wall of the car by hooking the hooks 30 over the staples W as indicated in Fig. 6, and placing the bottom ends of the legs 31 in the sockets U provided for receiving them, and folding the upper berth guard 34 upward into operative position, as indicated in Figs. 2, 3, and 11. The convertible seat member or cushion A is then laid upon the frame 29 and the platform 25 and depending wall portion 42 unfolded and secured in position—the cushion member A being secured to the guard 34 by means of a socket 51 on the seat member or cushion A— see Fig. 11—and a spring-pressed bolt or catch 52 on the guard 34. The bar or arm 37 on the frame 29 is turned to the required position to support the end member B of the upper berth, and the latter secured by means of a hook or hooks thereon and a staple r shown in Fig. 1, to the side wall of the car and in position to rest upon the arm 37. Suspended rods or links 53 and 54, shown in Fig. 2 secured at their upper end to the ceiling, may be connected at their lower end with guard 34, and thereby with the upper berth-supporting frame, and form an additional support for the upper berth. The convertible cushions or seat members which form the lower berth, having been placed in position, and the head rests having been raised, the bedding may be placed on the berths in such manner as to leave the space between one end of each berth and the adjacent portion adapted to enable the occupant of each berth to stand erect while dressing or undressing. The space at the end of the platform 25, and between the wall portion 42 and the adjacent partition may be covered by a curtain—not shown; and the side of the compartment toward the aisle may be covered by curtains in the ordinary manner, and which curtains it is not deemed necessary to illustrate or describe herein.

I claim:

1. In a sleeping car the combination of a lower berth, and an upper berth located directly over the lower berth, the upper berth having a movable berth member at one end and a platform below said movable berth member and above the end of the lower berth.

2. In a sleeping car the combination of a lower berth, an upper berth directly above the lower berth, and a platform located below the level of the upper berth the lower berth having a movable berth member at one end, and having its opposite end extending beneath said platform.

3. In a sleeping car, an upper berth comprising in its construction a plurality of convertible car seat members, a supporting foldable metallic frame having a foldable berth guard rail hinged at the edge of said frame farthest from the car wall, and a swinging arm pivoted to said edge of the frame and adapted to be turned horizontally into position to extend beyond either end of said foldable frame and form a support for one side of an end member of the berth.

4. In a sleeping car, an upper berth comprising in its construction a plurality of convertible car seat members, a platform normally located below the level of the upper berth, a partition member hinged to a convertible seat member and in hinged engagement with one edge of the platform, and means for supporting the opposite edge of the platform, said platform and partition being adapted to be folded into position to extend along the bottom of the convertible seat member with which the partition member is connected.

5. In a sleeping car, an upper berth comprising in its construction a plurality of removable berth members, a metallic foldable frame in supporting engagement with at least one of said members, and a platform connected with a berth member which is supported by said frame, the berth member with which said platform is connected being reversible on said frame, and adapted to permit the platform to be supported in operative position at either end of the berth, as desired.

6. In a sleeping car, a berth comprising in its construction a plurality of convertible car seat members and a supplementary movable member forming the portion of the berth not formed by the convertible car seat members, said supplementary movable member being interchangeable with one of the convertible car seat members, and adapted to be shifted into position to form either end of the berth, as desired.

7. In a sleeping car, a compartment provided with a berth having a movable member adapted to be moved into and out of operative position, to provide standing room for occupants when said member is out of operative position, and a seat frame provided with a hinged end portion adapted to form a door for admitting occupants to the standing room portion of said compartment.

8. In a sleeping car, the combination of a lower berth, an upper berth, a platform located above the level of the lower berth and below the level of the upper berth and forming a floor for the latter, and an inner wall member extending from the platform upward toward the upper berth, said upper berth comprising in its construction a movable berth member adapted to extend over said platform.

9. In a sleeping car, the combination of a lower berth, an upper berth extending over the lower berth, a platform located above the level of the lower berth and below the level of the upper berth, and adapted to form a floor for the latter, an inner wall member extending from the platform to the upper berth, and a removable frame in supporting engagement with the upper berth.

10. In a sleeping car, the combination of a lower berth, an upper berth extending over the lower berth, a platform located above the level of the lower berth and below the level of the upper berth, partitions between which the berths are located, means for securing said platform to one of the partitions, and means for supporting the upper berth and the opposite edge of the platform, said upper berth comprising in its construction a movable berth member located over said platform.

11. In a sleeping car, the combination of a car body having side walls and a floor, a berth, means for removably securing the berth to the side wall of the car, removable partitions between which the berth is located, means for removably securing said partitions in operative position, means for supporting the inner side of the berth, a platform located below the level of the berth, and means for securing said platform in position, said berth comprising in its construction a movable member adapted to extend over the platform.

12. In a sleeping car, the combination of a car body, partitions dividing the car into compartments, a berth located between said partitions and comprising in its construction a movable berth member adapted to provide a space between the next adjacent berth portion and a wall of the compartment, for enabling an occupant to stand in said space, and a seat frame comprising in its construction a door for said compartment.

13. In a sleeping car, the combination of a car body, partitions dividing the interior of the car into compartments, a berth located between said partitions, and a removable berth-supporting frame comprising in its construction a main frame portion, and legs hinged to said main frame portion and foldable into position to extend diagonally thereof.

14. In a sleeping car, the combination of a car body, having side walls, partitions dividing the interior of the car into compartments, and a removable berth-supporting frame adapted to be removably secured to the side wall of the car, and comprising in its construction a main frame portion, and legs hinged to and of greater length than said main frame portion, for supporting one side of the latter.

ORREN M. DONALDSON.

Witnesses:
HARRY IRWIN CROMER,
JENNIE L. FISKE.